UNITED STATES PATENT OFFICE.

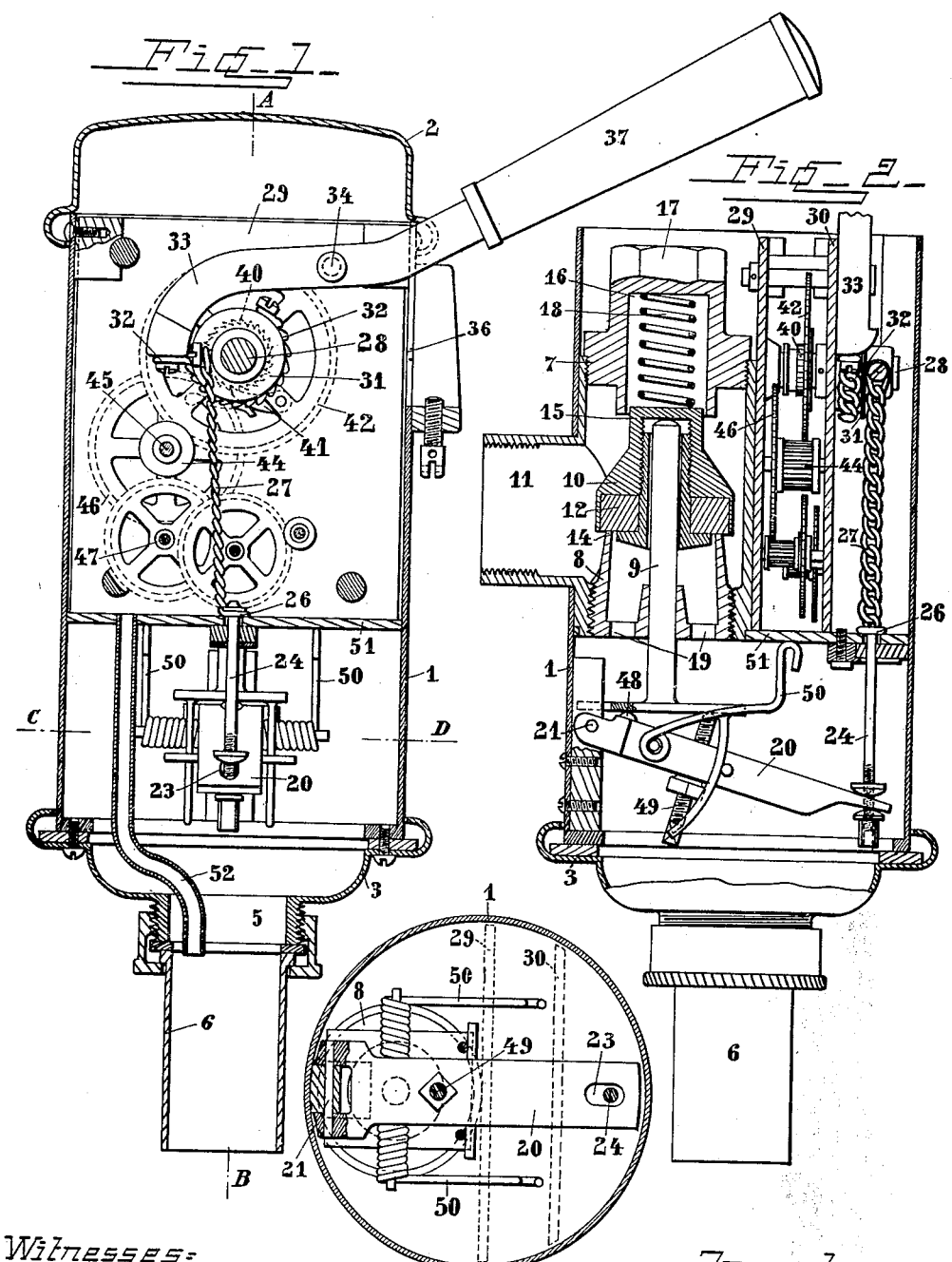

JOSEF NEŸER, OF ZURICH, SWITZERLAND.

FLUSHING APPARATUS FOR CLOSETS.

1,189,379.  Specification of Letters Patent.  Patented July 4, 1916.

Application filed September 30, 1912, Serial No. 723,199. Renewed April 6, 1916. Serial No. 89,475.

*To all whom it may concern:*

Be it known that I, JOSEF NEŸER, engineer, a citizen of the Swiss Confederation, residing at 8 Erikastrasse, Zurich, Switzerland, have invented a new and useful Flushing Apparatus for Closets, of which the following is a specification.

The invention relates to an apparatus for flushing closets and more particularly to that class comprising a flushing valve for delivering a given quantity of water at each operation of a lever.

Until now pistons, membranes or screw-regulated openings for the passage of air or water have been used to close the valves at a predetermined time.

The object of the present invention is to obviate the above named means by making the closing action independent of the water pressure and I attain this object by making use of a clockwork which closes the valve after a given time.

An apparatus according to my invention is shown in the accompanying drawings in which—

Figure 1 is a sectional elevation of the entire apparatus. Fig. 2 is a section on line A—B of Fig. 1, parts of the apparatus being removed. Fig. 3 is a section on line C—D of Fig. 1.

In the drawing 1 denotes a casing of sheet metal which is closed by a cover 2. The bottom plate 3 of said casing 1 is provided with a socket 5 to which a pipe 6 leading to the closet is connected by a nut in the well known manner. In the casing 1 a valve body 7 is arranged having a socket 11 by means of which the apparatus is screwed on to the water supply pipe. In the valve body 7 a sleeve 8 is arranged in which is disposed a spindle 9. On the spindle 9 the valve 10 is loosely mounted, said valve consisting of the two parts screwed together and holding a rubber ring 12 which normally rests on seat 14 of the sleeve 8. The upper part 15 of valve 10 is cylindrical and is guided in a bore 16 of a cap nut 17 screwed into the valve body 7. In said bore 16 a coiled spring 18 is arranged which presses the valve 10 on the seat 14. The bottom of the sleeve 8 is provided with passages 19 for the water. The spindle 9 rests on a lever 20 which is pivoted at 21 in a suitable bearing secured to the casing 1. The free end of lever 20 is provided with a bore 23 through which a spindle 24 projects. The spindle 24 is partly screw-threaded and on the screw threaded part there are two nuts between which the free end of the lever 20 projects. The spindle 24 is provided with a head 26 to which one end of a small chain 27 is fixed. The other end of said chain 27 is fixed to an arbor 28 rotatably mounted in two parallel plates 29, 30 fixed in the casing 1. On the arbor 28 a small drum 31 is fixed on which the one end of a chain 32 is secured. The chain 32 is wound around the drum 31 and is moreover connected with one arm 33 of a double armed lever pivoted at 34 on plate 30. The other arm of said lever projects through a slot 36 in the casing 1; the protruding part of said lever is provided with a handle 37.

On the arbor 28 a ratchet wheel 40 is fastened and with the ratchet wheel 40 a pawl 41 is held in engagement by a spring. The pawl 41 is mounted on a spur wheel 42 rotatably mounted on the arbor 28 and arranged close by the said ratchet wheel. The spur wheel 42 meshes with a gear 44 fixed to a spindle 45 rotatably mounted between the plates 29, 30. On the spindle 45 there is another spur gear 46 which drives a pair of spurwheels on a spindle 47 the said spurwheels driving other gears and so on.

By pushing the handle downwardly the drum 31 is rotated taking with it the arbor 28. Simultaneously the spindle 24 is moved upwardly and the lever 20 is swung about its pivot. The lever 20 lifts the spindle 9 by means of a nose 48 and a set screw 49 and the valve 10 is raised from its seat. The water flows now freely through the socket 5 and pipe 6 to the closet. After the handle is let free the spring 18 together with the water pressure acts on valve 10 and on the lever 20 pressing the same downwardly. The spindle 24 follows the lever 20 and rotates the arbor 28. As the direction of rotation is now reversed the train of gears 42, 44 is set in motion offering a certain resistance to the action of the spring 18. The valve 10 is closed after an interval and the time it takes to close the valve may be altered by adding or taking away sets of spur wheels. In this manner the amount of water dispensed each time the handle is pressed down may be varied to suit requirements. On the lever 20 two auxiliary springs 50 are arranged assisting the spring 18. The plates 29, 30 are placed on a horizontal plate 51 which prevents the water from raising up to the handle. To draw-off water which may pass along the spindle 24 I provide a small pipe 52 the lower end of which being in the socket 5. If water rushes through said socket 5 the stray water above plate 51 is sucked off.

The apparatus is quite independent of the water pressure and needs little space. In some cases the spring 18 may be dispensed with as the water pressure on valve 10 tends to press the valve on its seat.

I claim:—

A flushing valve comprising a spring actuated valve, a seat provided therefor, a shaft journaled in said seat normally engaging said valve, a lever hinged to the casing of said valve, an actuating member provided, and means connecting said member to the free end of said lever, the intermediate portion of said lever engaging said shaft, whereby said lever, shaft and valve are raised when said member is actuated, and means co-acting with said member to retard the return movement of said valve, said means consisting of a train of gears, and means connecting said member and gears to operate said gears after said valve has been opened, substantially as described.

In testimony whereof I have signed my name to this specification in the presence of two subscribing witnesses.

JOSEF NEŸER.

Witnesses:
 HANS HUNYILE,
 PAUL GUBLER.

Copies of this patent may be obtained for five cents each, by addressing the "Commissioner of Patents, Washington, D. C."